United States Patent
Tipton et al.

(10) Patent No.: US 12,470,308 B2
(45) Date of Patent: Nov. 11, 2025

(54) MEASUREMENT SYSTEM AND METHOD FOR MEASURING AND ANALYZING MODULATED SIGNALS

(71) Applicant: Rohde & Schwarz GmbH & Co. KG, Munich (DE)

(72) Inventors: Darren Tipton, Poering (DE); Johan Nilsson, Hoehenkirchen-Siergertsbrunn (DE); Christian Kuhn, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 133 days.

(21) Appl. No.: 18/362,063

(22) Filed: Jul. 31, 2023

(65) Prior Publication Data
US 2024/0214084 A1    Jun. 27, 2024

(30) Foreign Application Priority Data
Dec. 21, 2022   (EP) .................................. 22 215 240

(51) Int. Cl.
*H04B 17/00*   (2015.01)
*H04B 17/20*   (2015.01)

(52) U.S. Cl.
CPC ........... *H04B 17/25* (2023.05); *H04B 17/201* (2023.05)

(58) Field of Classification Search
CPC ...... H04B 17/16; H04B 17/25; H04B 17/294; H04B 17/201; H04L 27/0014
See application file for complete search history.

(56) References Cited

U.S. PATENT DOCUMENTS

| 5,748,507 A | 5/1998 | Abatzoglou et al. |
| 8,908,753 B2 * | 12/2014 | Li .................... H04B 17/21 375/224 |

(Continued)

FOREIGN PATENT DOCUMENTS

| DE | 10 2013 207 426 A1 | 11/2013 |
| EP | 3007375 A1 | 4/2016 |
| WO | 94/21071 A1 | 9/1994 |

OTHER PUBLICATIONS

Extended European Search Report issued in EP 22215240.7-1206 by the European Patent Office on Jun. 13, 2023.

(Continued)

*Primary Examiner* — Dac V Ha
(74) *Attorney, Agent, or Firm* — Studebaker Brackett PLLC (57) ABSTRACT

The invention relates to a measurement system, including a signal analyzer or monitoring receiver, for measuring and analyzing modulated signals. The system includes a signal acquisition device having input port(s), wherein the signal acquisition device is configured to capture modulated signal (s) applied to the input ports, wherein each captured modulated signal can be represented as an I/Q signal; wherein the signal acquisition device generates at least two digital I/Q data streams based on the one or more modulated signals, wherein the at least two digital I/Q data streams are generated in parallel. The measurement system includes a selection device to select at least one target frequency bandwidth in each of the at least two digital I/Q data streams; and a signal processing device configured to analyze the at least two digital I/Q data streams in the selected target frequency bandwidths.

13 Claims, 10 Drawing Sheets

(56) References Cited

U.S. PATENT DOCUMENTS

| | | | | |
|---|---|---|---|---|
| 2004/0028123 | A1* | 2/2004 | Sugar | H04L 1/1664 |
| | | | | 375/224 |
| 2007/0291883 | A1* | 12/2007 | Welz | H04B 1/30 |
| | | | | 375/350 |
| 2015/0136971 | A1* | 5/2015 | Green | H01J 49/0009 |
| | | | | 250/281 |
| 2016/0099784 | A1* | 4/2016 | Bratfisch | H04B 17/101 |
| | | | | 375/228 |

OTHER PUBLICATIONS

Bravo, A. et al., Digital quadrature demodulator with four phases mixing for digital radio receivers, IEEE Transactions on Circuits and Systems II: Analog and Digital Signal Processing, Institute of Electrical and Electronics Engineers Inc, vol. 50, No. 12, Dec. 1, 2003, pp. 1011-1015.

* cited by examiner

MEASUREMENT SYSTEM AND METHOD FOR MEASURING AND ANALYZING MODULATED SIGNALS

TECHNICAL FIELD OF THE INVENTION

The invention relates to a measurement system and a method for an accelerated measurement and analysis of modulated signals, in particular 5G or 6G communication signals.

BACKGROUND OF THE INVENTION

To increase the data rate per user, many modern communications standards, such as 5G or 6G standards, employ multi-carrier configurations (termed carrier aggregation or CA). Thereby, several individual frequency blocks (so called carriers or component carriers) are assigned to a user. However, measuring and analyzing communication signals, which employ such carrier aggregation, can be time consuming.

For instance, a typical measurement approach comprises sequential measurements where individual measurements are subsequently performed for each carrier in a wideband signal. However, such a sequential measurement approach and the complex signal processing required for wideband signals can make the signal analysis very time consuming.

SUMMARY OF THE INVENTION

Thus, it is an objective to provide an improved measurement system and an improved method for measuring and analyzing modulated signals. In particular, the above-mentioned disadvantages should be avoided.

The objective is achieved by the solution provided in the enclosed independent claims. Advantageous implementations of the present invention are further defined in the dependent claims.

According to a first aspect, the invention relates to a measurement system, in particular a signal analyzer or monitoring receiver, for measuring and analyzing modulated signals. The measurement system comprises a signal acquisition device having one or more input ports, wherein the signal acquisition device is configured to simultaneously capture one or more modulated signals applied to the input ports, wherein each captured modulated signal can be represented as an I/Q signal; wherein the signal acquisition device is configured to generate at least two digital I/Q data streams based on the one or more modulated signals, wherein the at least two digital I/Q data streams are generated in parallel. The measurement system further comprises a selection device configured to select at least one target frequency bandwidth in each of the at least two digital I/Q data streams; and a signal processing device configured to analyze the at least two digital I/Q data streams in the selected target frequency bandwidths.

This achieves the advantage that several components of one or more modulated signals can be processed and analyzed in parallel. For instance, several carriers of a wideband communication signal can be analyzed in parallel.

Preferably, the signal processing device is configured to analyze the at least two digital I/Q data streams in the selected frequency bandwidths in parallel (i.e., simultaneously). In addition or alternatively, the selection device can be configured to perform the selection of the target frequency bandwidth(s) in each of the at least two digital I/Q data streams in parallel.

The one or more modulated signals can be received from at least one device-under-test, DUT, connected to the input port(s). The DUT can be a portable communication device. The DUT can be e.g., an amplifier, mixer or even a base station. It also be a non-portable device.

In particular, the DUT is a 5G or 6G capable device and the modulated signals are communication signals according to a 5G or 6G standard. The modulated signals can be radio frequency (RF) signals and are preferably configured according to a multi-carrier configuration, i.e. they can comprise multiple component carriers, each component carrier having a specific bandwidth.

Note that the invention is not limited to 5G and 6G applications. It may be applied e.g., to other radio standards offering parallel channels.

The modulated signals received at the input port(s) can be analog signals. Each modulated signal can be an I/Q signal, i.e. a signal which comprises an in-phase and a quadrature signal component (e.g., two amplitude-modulated sinusoids that are offset in phase by one-quarter cycle, i.e., 90 degrees). Each of the modulated signals can have a respective bandwidth.

The signal acquisition device can be configured to capture the modulated signals at the input ports simultaneously. Thus, the system can perform an acquisition, processing and analysis of a plurality of modulated signals in parallel.

The target frequency bandwidth which is selected in an I/Q data stream can represent a channel, a sub-channel, a carrier or a carrier component in the I/Q data stream respectively in the corresponding modulated signal received at one of the input ports. Thus, the measurement system can select, process and analyze a number of different carriers within the same modulated broadband signal. The selection of the target frequency bandwidths (i.e., the selection of the carriers to be analyzed in parallel) can be carried out by a user of the system, e.g. via a user interface.

The signal processing device can be configured to analyze the data streams by applying mathematical operators to the I/Q data streams and/or to visualize the selected components of the I/Q data streams.

The selection device may comprise at least two digital down conversion (DDC) units, wherein each DDC unit is configured to receive and down convert one of the at least two digital I/Q data streams, e.g. to an intermediate or a baseband frequency. This down conversion of the individual I/Q data streams via the different DDC units is preferably performed in parallel. The selection device may further comprise filters, e.g. band-pass filters to facilitate the selection of the bandwidths, and/or may perform a resampling for adjusting the output sample-rate of the digitized signal.

In an embodiment, the signal acquisition device comprises at least two ADC units configured to convert the one or more modulated signals into the at least two digital I/Q data streams. In particular, this digitalization of the modulated signals (or of components thereof) can be performed in parallel by the at least two ADC units. For instance, each ADC unit can be configured to feed a generated digital I/Q data stream to one of the DDC units.

In an embodiment, the signal acquisition device has at least two input ports; wherein, in a first operating mode, the signal acquisition device is configured to capture a respective modulated signal at each input port, and to feed each captured modulated signal to a respective ADC unit for generating a respective digital I/Q data stream, wherein each digital I/Q data stream represents both an in-phase and a quadrature component of a respective captured modulated signal.

Thus, in the first operating mode of the measurement system, two (or more) input ports of the system can receive modulated signals, wherein each received signal can be digitalized by a respective ADC unit. This digitalization of the different modulated signals can be carried out in parallel. Thereby, each signal is digitalized with the sampling rate of the ADC unit (for example 4 GHz). Thus, the first operating mode achieves the advantage of a parallel digitalization of two (or more) separate modulated signals.

In an embodiment, the signal acquisition device comprises two mixing units; wherein, in the first operating mode, each mixing unit is configured to mix one of the captured modulated signals down to an intermediate frequency and, subsequently, feed the signal to one of the ADC units.

In an embodiment, in a second operating mode, the signal acquisition device is configured to capture a single modulated signal at one of the input ports, and to split the modulated signal into an in-phase signal component and a quadrature signal component in the analog domain; wherein the signal acquisition device is configured to feed each of the in-phase and quadrature signal components to a different ADC unit in order to generate a first digital I/Q data stream representing the in-phase component of the modulated signal and a second digital I/Q data stream representing the quadrature component of the modulated signal.

Thus, in the second operating mode of the measurement system, only one out of two input ports is used, wherein the respective signal fed to this input port is digitalized by two ADC units (one for the in-phase component and one for the quadrature component). Thus, the sampling rate used to digitalize the signal can be doubled (for example 2*4 GHz=8 GHz). Thus, the second operating mode achieves the advantage of digitalizing a single modulated signal with an increased sampling rate. In particular, the in-phase and quadrature signal components are digitalized in parallel.

In an embodiment, the signal acquisition device comprises two further mixing units, wherein the local oscillator signals of the two further mixing units have a 90° phase shift to each other; wherein, in the second operating mode, each of the two further mixing units is configured to receive the single modulated signal to generate either the in-phase component or the quadrature component of the modulated signal.

In particular, in the first operating mode, both local oscillators typically have a different frequency configuration (however, an identical frequency configuration of the oscillators is also possible). Thereby, the phase difference typically has no influence on the further selection and analysis of the generated digital I/Q data streams (two RF signals on different frequencies). In the second operating mode, both signals (i.e., the in-phase component and the quadrature component) typically have the same frequency, wherein the 90° phase shift can ensure an ideal analog IQ mixer (one RF signal on the same frequency with "twice the bandwidth").

In an embodiment, the selection device is configured to further split at least one of the I/Q data streams in the selected bandwidth into a plurality of sub data streams. Preferably, the selection device is configured to perform said splitting in parallel. This achieves the advantage that a plurality of signal components of a captured modulated signal, e.g. channels, sub-channels, carrier or component carriers, can be selected for further parallel processing and analysis.

In particular, the selection device may comprise a signal splitting unit which carries out said signal splitting. The signal splitting unit can be implemented in hardware and/or software. In particular, for low bandwidth, a software solution can be feasible in real-time.

In an embodiment, the signal processing device is configured to receive and to analyze the plurality of sub data streams, preferably in parallel.

In an embodiment, the selection device comprises at least one field programmable gate array, FPGA, or at least one ASIC.

In an embodiment, at least one of the digital I/Q data streams comprises data over the entire bandwidth of a modulated signal received at the input ports or of a certain frequency span of the modulated signal.

According to a second aspect, the invention relates to a method for measuring and analyzing modulated signals. The method comprises the steps of: capturing one or more modulated signals from at least one device-under-test, DUT, in particular from a wireless communication device, wherein each captured modulated signal can be represented as an I/Q signal; generating at least two digital I/Q data streams based on the one or more modulated signals, wherein the at least two digital I/Q data streams are generated in parallel; selecting at least one target frequency bandwidth in each of the at least two digital I/Q data streams; and analyzing the at least two digital I/Q data streams in the selected target frequency bandwidths.

This achieves the advantage that several components of one or more modulated signals can be processed and analyzed in parallel. For instance, several carriers of a wideband communication signal can be analyzed in parallel.

In an embodiment, in a first operating mode, at least two modulated signals from the at least one DUT are captured, and a respective digital I/Q data stream is generated based on each captured modulated signal; wherein each digital I/Q data stream represents both an in-phase and a quadrature component of a respective captured modulated signal.

In an embodiment, in a second operating mode, a single modulated signal from the at least one DUT is captured and split into an in-phase signal component and a quadrature signal component in the analog domain; wherein a first digital I/Q data stream representing the in-phase component of the modulated signal and a second digital I/Q data stream representing the quadrature component of the modulated signal are generated.

In particular, the method can be carried out according to the first operating mode and/or according to the second operating mode.

In an embodiment, the method comprises the further step of: splitting at least one of the I/Q data streams in the selected bandwidth into a plurality of sub data streams. Preferably, the splitting is done in parallel.

In an embodiment, the method comprises the further step of: analyzing the plurality of sub data streams, preferably in parallel.

The above description with regard to the measurement system according to the first aspect of the invention is correspondingly valid for the method according to the second aspect of the invention.

BRIEF DESCRIPTION OF THE DRAWINGS

The invention will be explained in the following together with the figures.

DETAILED DESCRIPTION OF THE PREFERRED EMBODIMENTS

Figure 1:
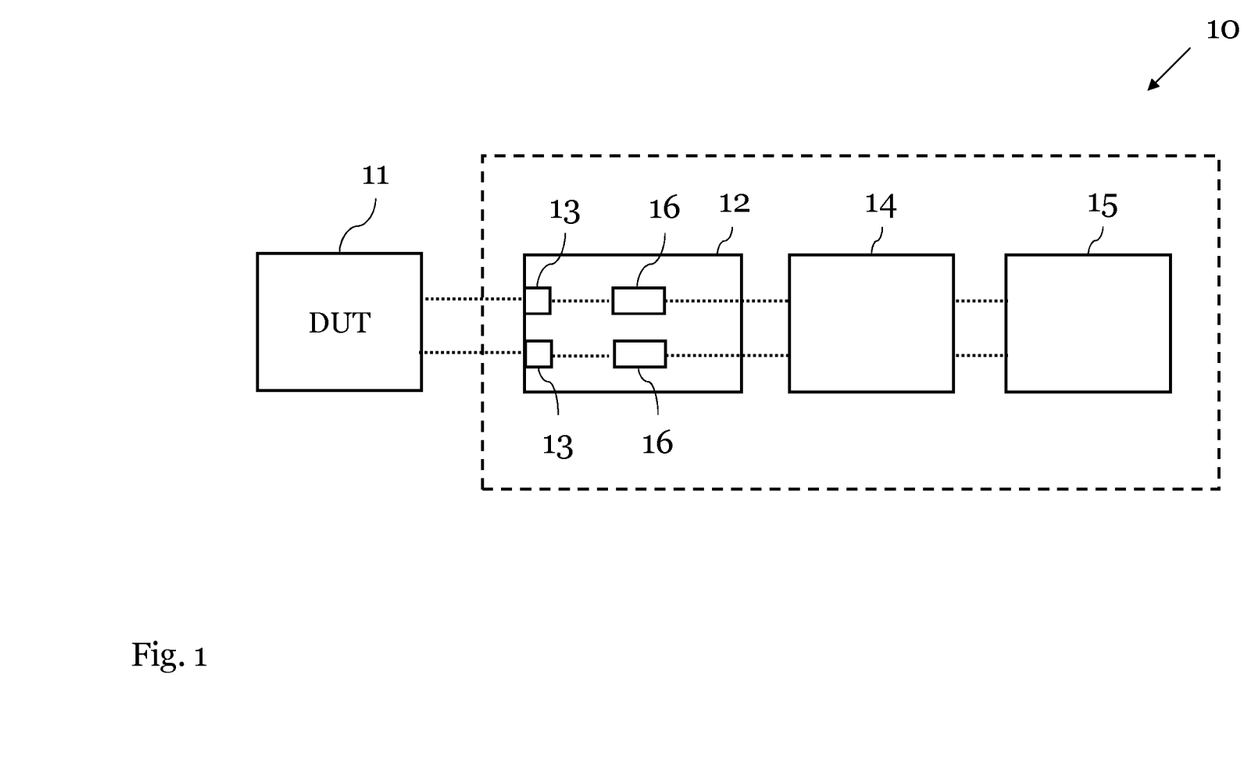
FIG. 1 shows a schematic diagram of a measurement system for measuring and analyzing modulated signals according to an embodiment.

FIG. 1 shows a schematic diagram of a measurement system 10 for measuring and analyzing a modulated signal according to an embodiment.

The measurement system 10 comprises a signal acquisition device 12 having one or more input ports 13, wherein the signal acquisition device 12 is configured to capture one or more modulated signals applied to the input ports, wherein each captured modulated signal can be represented as an I/Q signal. The signal acquisition device 12 is further configured to generate at least two digital I/Q data streams based on the one or more modulated signals, wherein the at least two digital I/Q data streams are generated in parallel by the signal acquisition device 12. The measurement system 10 further comprises a selection device 14 configured to select at least one target frequency bandwidth in each of the at least two digital I/Q data streams; and a signal processing device 15 configured to analyze the at least two digital I/Q data streams in the selected target frequency bandwidths. In particular, each digital I/Q data stream is analyzed in the target frequency bandwidth which was selected for said I/Q data stream, e.g. by a user of the system 10.

The one or more modulated signals can be received from at least one DUT 11 which is connected to the input port(s) 13. For instance, as shown in FIG. 1, the DUT 11 can have several output ports for outputting signals, wherein each output port of the DUT 11 can be connected to an input port 13 of the signal acquisition device 12.

The DUT 11 can be a portable communication device. The DUT can be e.g., an amplifier, mixer or even a base station. It also be a non-portable device.

In particular, the DUT is a 5G or 6G capable device and the modulated signals are communication signals according to a 5G or 6G standard. In particular, the DUT 11 is a 5G or 6G capable device and the modulated signals are mobile communication signals according to a 5G or 6G standard. The modulated signals can be configured according to a multi-carrier configuration, i.e. can comprise multiple component carriers with a specific bandwidth.

Note that the invention is not limited to 5G and 6G applications. It may be applied e.g., to other radio standards offering parallel channels.

The modulated signals received at the input port(s) 13 can be analog signals. Each modulated signal can be an I/Q signal, i.e. a signal which comprises an in-phase and a quadrature signal component (e.g., two amplitude-modulated sinusoids that are offset in phase by one-quarter cycle, i.e., 90 degrees). Each of the modulated signals can have a respective bandwidth.

The measurement system 10 can be a measurement instrument, such as a signal analyzer or a monitoring receiver or any other system suitable to receive and analyze modulated signals from DUTs 11.

The measurement system 10 shown in FIG. 1 comprises two input ports 13. However, the system can have any number of inputs ports, e.g. 1, 2, 4 or 8. The input ports 13 can be wireless or wire bound ports.

Preferably, the signal acquisition device 12 comprises at least two ADC units 16. Each ADC unit 16 can be formed by an analog-to-digital converter (A/D-converter or ADC) for converting the one or more modulated signals received at the input port(s) 13 into the at the least two digital I/Q data streams.

The measurement system 10 can be configured to operate in a first operating mode and in a second operating mode.

In the first operating mode, the IQ data of the signal applied to one input port is separated after the digitalization, i.e. after converting the modulated signal(s) to the I/Q data streams. As such, each ADC 16 of the acquisition device 12 samples the analog signal comprising both the in-phase component and the quadrature component of the modulated signal Thereby, the modulated IQ components can be contained. However, in general, the signal is not a complex-valued IQ signal, but a real-valued IF signal. In this case, a mixing with a 90° phase shift (to separate the in-phase from the quadrature component) is preferably carried out digitally in a later step.

In the first operating mode, two input ports 13 can be operated in parallel, wherein the respective modulated signal fed to each input port is digitalized by a respective ADC 16. Each signal is thereby digitalized by the sampling rate of the respective ADC 16 (for example 4 GHz).

In contrast to FIG. 1, the DUT 11 might also have only one output port connected to the receiver (acquisition device 12). Thereby, in the first operating mode, the two receiver paths in the acquisition device 12 (with two independent local oscillators, see FIG. 4) could be used to select a bandwidth around a respective RF center frequency of the signal received from the DUT.

In the second operating mode, the IQ-data of the signal applied to one input port is separated into the in-phase and the quadrature component before digitalization takes place. This separation can be performed by two analog mixers with a 90° phase shift. The in-phase component and the quadrature component are then fed to different ADCs 16.

Thus, in the second operating mode, for example, only one out of two input ports is used, wherein the respective signal fed to this input port is then digitalized by the two ADCs 16. The sampling rate used to digitalize the respective signal can double due to using two ADCs 16 for the signal components of a single modulated signal (for example 2*4 GHz=8 GHz).

FIGS. 2-5 show schematic diagrams of the measurement system 10 according to further embodiments.

Each of the measurement systems 10 shown in FIGS. 2-5 comprises at least one analog front end 21 and at least one digital baseband board (DBB) 22 that is connected to the signal processing device 15 and/or a further signal processing device, e.g., a device PC. For instance, a first signal processing can take place on a FPGA/ASIC board of the DBB 22 and a subsequent signal processing can be carried out by the device PC.

Both the analog front end 21 and the DBB 22 can comprise a respective board, e.g. a PCB board. However, the components of the analog front ends 21 and the DBBs 22 can also be arranged on a single board. The DBB 22 can be connected to the signal processing device 15 (or further signal processing device) via a PCIe interface. In particular, the analog front ends 21 and the ADCs 24 can be connected via an analog connection.

The signal acquisition device 12 and the selection device 14 of the measurement system 10, as shown in FIG. 1, can be at least partially formed by the components of the analog front end 21 and the DBB 22. For instance, the ADCs 24 on the DBB(s) 22 in FIGS. 2-5 can form the ADC units 16 of the signal acquisition device 12 and the RF input ports RF A-RF D of the analog front end(s) 21 can form the input ports 13 of the signal acquisition device 12.

Figure 2:
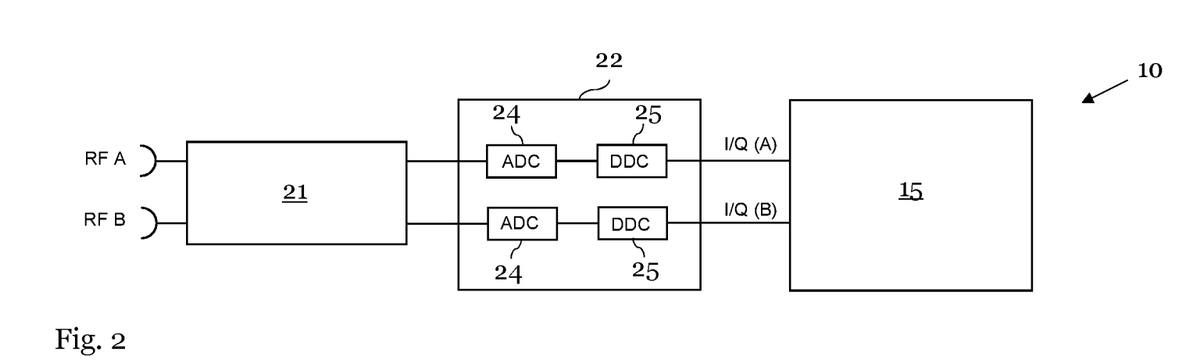
FIGS. 2-5 show schematic diagrams of a measurement system according to further embodiments.

FIG. 2 shows an example of a measurement system 10 with a single analog front end 21 and a single DBB 22. By using only one analog front end 21, all input ports RF A, RF B are connected to or housed on the same analog front end.

Figure 3:
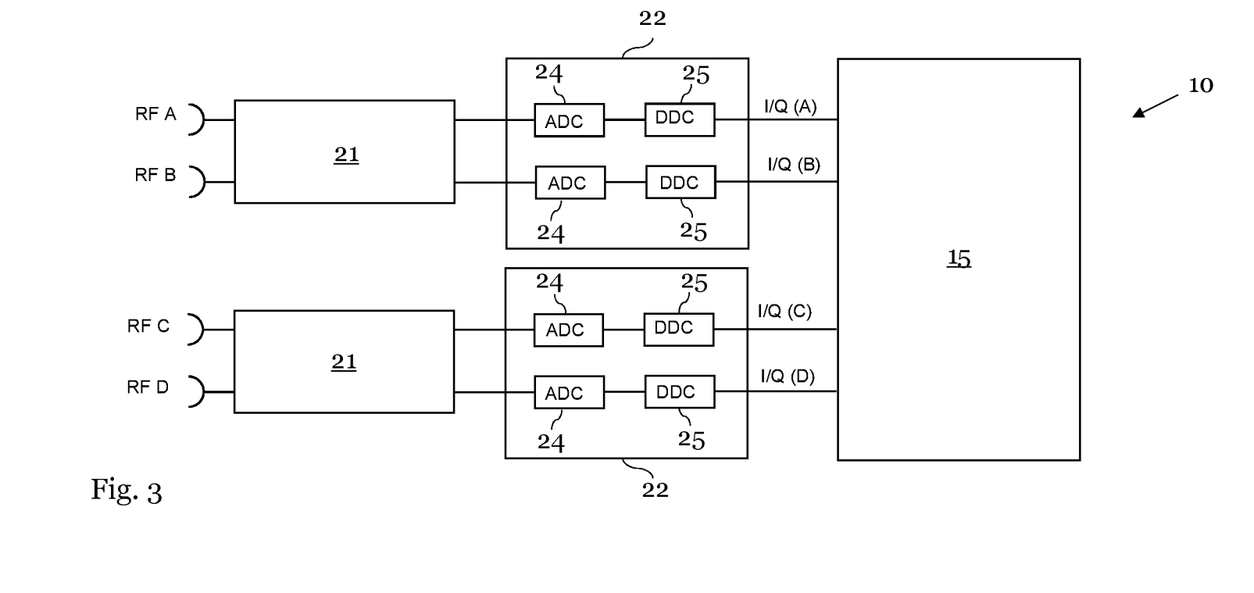

However, preferably two analog front ends can be used, as shown in FIG. 3, wherein two input ports 13 (RF input ports RF A and RF B) are connected to a first analog front end 21 and wherein two further input ports 13 (RF input ports RF C and RF D) are connected to a second analog front end 21. Alternatively, it is also possible that the number of analog front ends 21 equals the number of input ports 13.

The input ports 13 can either be connected directly to the analog front end(s) 21 or indirectly, e.g., by using additional circuit units. An additional circuit unit can comprise a printed circuit board having, for example, one or more of the following elements: filters (especially bandpass filters), mixers, attenuators and/or amplifiers. These elements can be switched into the signal paths if needed.

Figure 4:
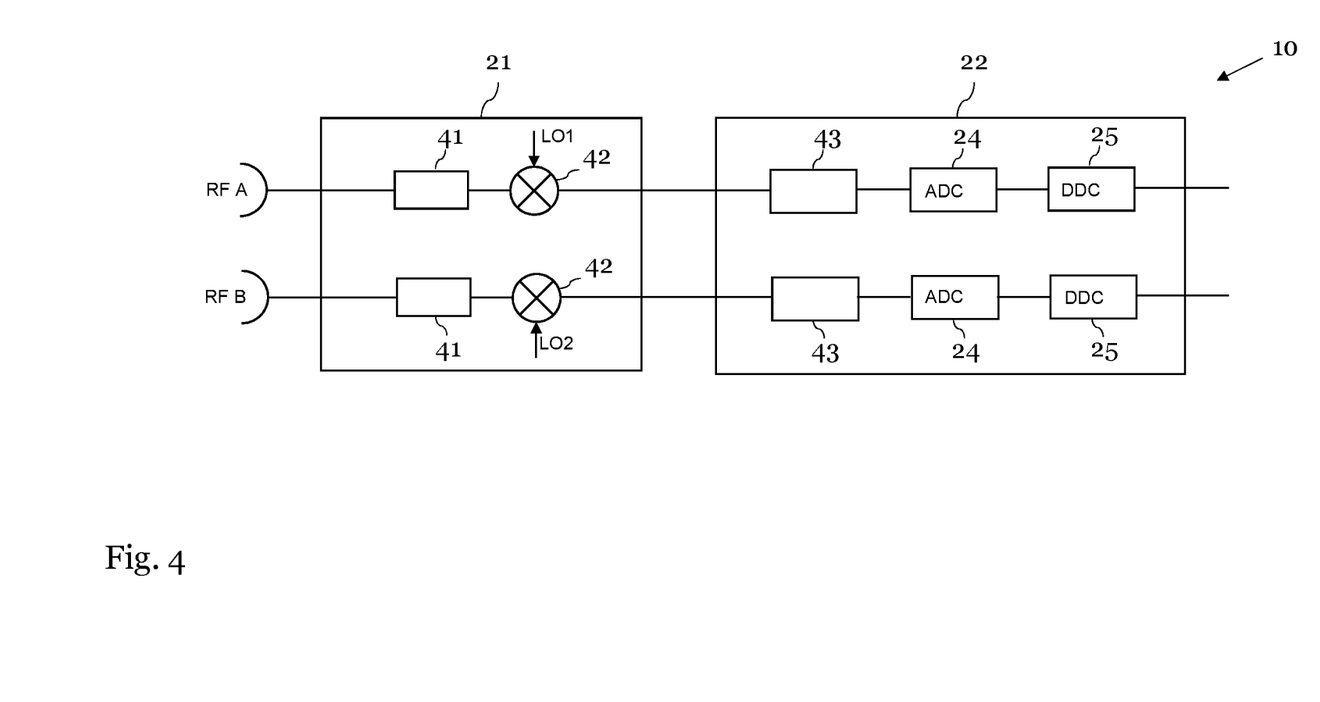

FIGS. 2, 3 and 4 show measurement systems 10 with one or more analog front ends 21 which operates in the first operating mode. For instance, in this case, the data stream fed through the input port RF A is mixed down and fed to a first ADC 24, while the data stream fed through the input port RF B is mixed down and fed to a second ADC 24.

As shown in FIG. 4, the analog front end 21 may comprise a number of filters 41, especially bandpass filters, and a number of mixing units 42, e.g. one bandpass filter and/or one mixing unit 42 for each input port RF A, RF B. The analog front end 21 can be configured to mix the modulated signals received at each input port RF A, RF B to an intermediate frequency (IF) using the respective mixing units 42. Thereby, each of the mixing units 42 can receive a reference signal LO1, LO2 from a respective local oscillator. For instance, the signal acquisition device 12 of the system 10 may comprise the analog front end(s) 21.

Figure 5:
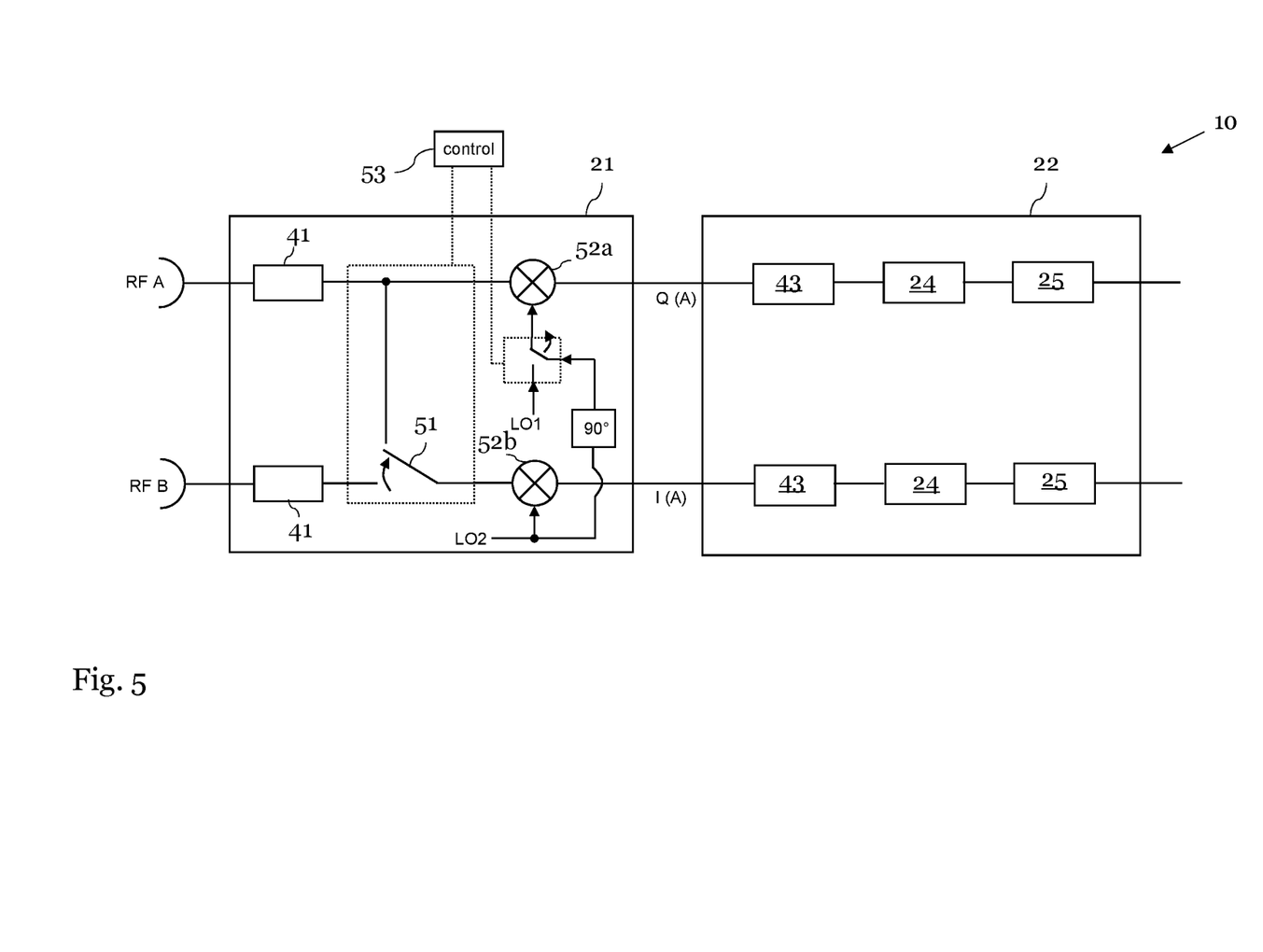

FIG. 5 shows a measurement systems 10 with an analog front end 21 that operates in the second operating mode. In the second operating mode, for example, one RF input port (here: RF B) is decoupled from the respective ADC. This decoupling can be carried out by a controllable switch 51. The data stream received at the other RF input port (here: RF A) can be fed to a first further mixing unit 52a and in addition to a second further mixing unit 52b, wherein the local oscillator signal of the second further mixing unit 52b has a 90° phase shift relative to the first further mixing unit 52. The further mixing units 52a, 52b can comprise any suitable mixer or mixing device for analog signals. The controllable switch 51 and/or the further mixing units 52a, 52b can be controlled by a control unit 53.

Preferably, each analog front end 21 can output a number of (analog) IF data streams which corresponds to the number of input ports 13 connected to the respective analog front end 21.

For instance, each ADC 24 of the DBB 22 has a bandwidth of 4 GHz, such that in the first operating mode, the DDB 22 with two ADCs 24 can capture a maximum bandwidth of 4 GHz for each signal, while in the second operating mode, the DBB 22 can capture a single signal with a maximum bandwidth of 8 GHz.

In FIGS. 2-5, each analog front end 21 outputs two IF data streams: In the first operating mode of the system 10 (FIGS. 2-4), a first data stream comprises both the in-phase and the quadrature component of the modulated signal fed to one RF input port, while a second data stream comprises both the in-phase and the quadrature component of the modulated signal fed to another RF input port. In contrast, in the second operating mode of the system 10 (FIG. 5), a first data stream only comprises one of the components (in-phase or quadrature) of the modulated signal fed to one RF input port and a second data stream only comprises the other one of said components of the modulated signal fed to the one RF input port. For instance, in FIG. 5 the modulated signal is fed to RF input port RF A and split into the two data stream Q(A) and I(A), with Q(A) representing the quadrature component and I (A) representing the in-phase component of the modulated signal.

Each analog front end 21 can be connected to one DBB 22 which comprises at least one ADC 24. Furthermore, each DDB 22 preferably comprises at least one bandpass filter 43 and/or at least one digital down converter (DDC) 25. The arrangement of these components is, for instance, shown in FIG. 4. Preferably each DBB 22 comprises the same number of ADCs 24 and DDCs 25 as it receives data streams from the respective analog front end 21.

The DDCs 25 can be configured to receive the respective digitalized I/Q data streams from the ADCs 24 and to filter said I/Q data streams to a target bandwidth and/or to resample said I/Q data streams to a target sampling rate. The thus generated I/Q data streams can then be fed to the signal processing unit 15 for further analysis. For instance, in FIG. 3, each DDC 25 generates and forwards a respective digitalized I/Q data stream I/Q(A) to I/Q(D) to the signal processing unit 15.

Figure 6:
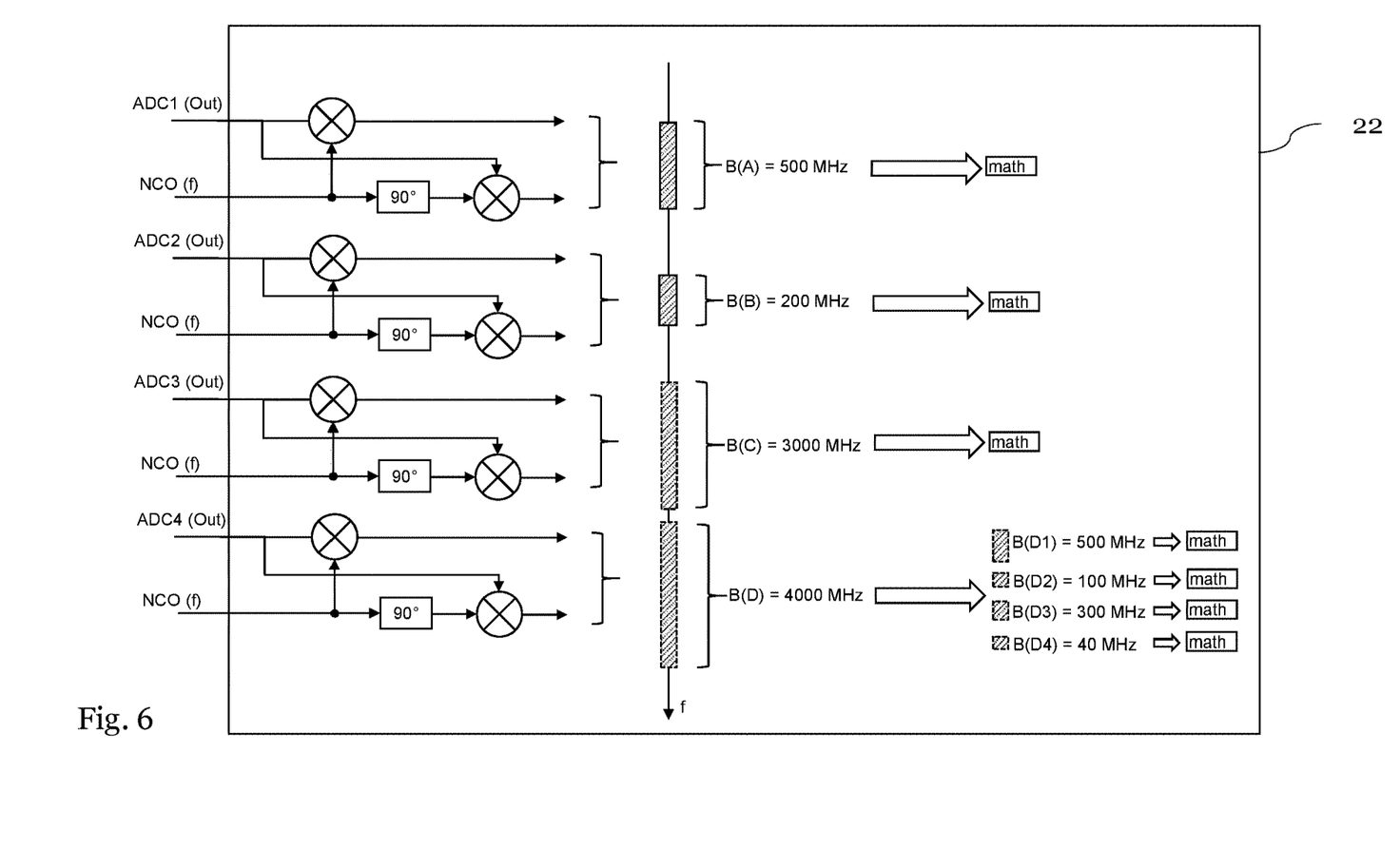
FIG. 6 shows a component of a measurement system according to an embodiment.
Figure 7:
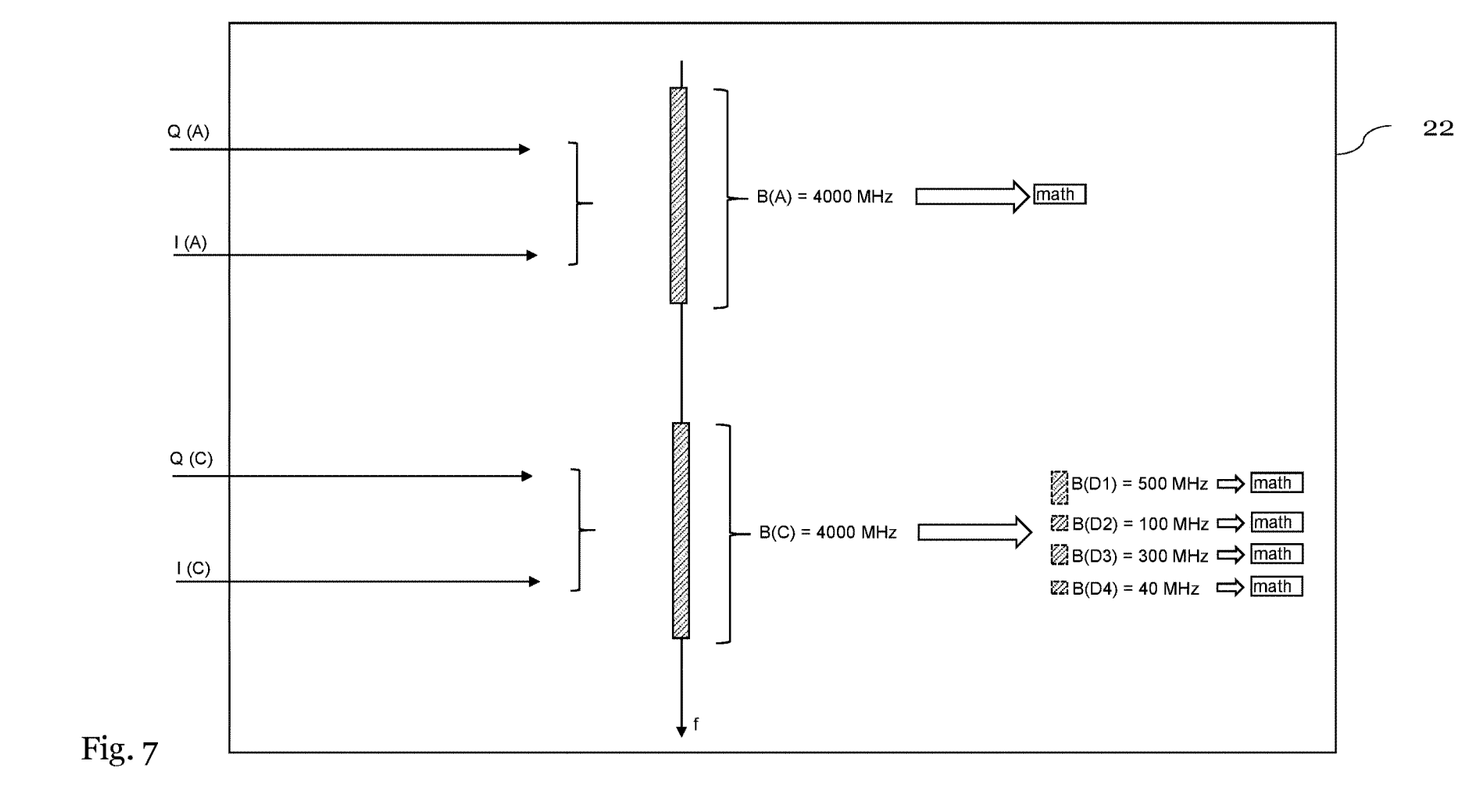
FIG. 7 shows a component of a measurement system according to an embodiment.

FIGS. 6 and 7 show schematic diagrams of a component of the measurement system 10 according to an embodiment. In particular FIG. 6 shows a configuration of the DBB 22 in the first operating mode of the system 10 and FIG. 7 shows a configuration of the DBB 22 in the second operating mode of the system 10. The DBBs 22 shown in FIG. 6 or 7 may correspond to the DBB 22 in any one of FIGS. 2-5.

Each DBB 22 can be configured to select the respective bandwidth within the digital I/Q data stream to be output to the signal processing device 15 for further analysis. Thus, the selection device 14 of the system 10 can at least partially be formed by components of the DBB 22. In particular, the selection device 14 comprises the DDCs 25 of the DBB 22.

For instance, FIG. 6 shows the DDB 22 configuration of a system 10 with four input ports 13 which operates in the first operating mode. Thereby, each data stream that is output by one of the ADCs 24 (here: ADC1(Out) to ADC4(Out)) is first converted to a lower frequency signal at a lower sampling rate (e.g., to a baseband or to an intermediate frequency) using the DDCs 25. As shown in FIG. 5, each DDC 25 may comprise two mixers with a 90° phase shift which are driven at an NCO frequency ($f_{NCO}$). In particular, in each case both mixers receive a real-valued input $x_n$ (IF signal) and generate a complex-valued output in the form of:

$$y_n = x_n \cos(2\backslash pi\ f_{NCO}\ t) + i * x_n \sin(2\backslash pi\ f_{NCO}\ t)$$

The DBB 22 may further comprise an FPGA or ASIC (not shown in FIG. 6) which is configured to select a respective frequency bandwidth in each I/Q data stream. For instance, the selected bandwidth B(A) of the data stream fed into the RF input port RF A can be selected to be 500 MHZ, the bandwidth of the data stream B(D) fed into RF input port RF B can be selected to be 200 MHz, the bandwidth of the data stream B(C) fed into RF input port RF C can be selected to be 3000 MHZ, and the bandwidth B(D) of the data stream fed into RF input port RF D can be selected to be 4000 MHZ. These bandwidths may represent carriers or carrier components within the modulated signals received at the respective input ports.

The digitalized I/Q data streams within the selected bandwidths can then be forwarded to the signal processing device 15 for further analysis. For instance, the data streams I/Q(A) to I/Q(D) as shown in FIGS. 2 and 3 correspond to said data streams within the selected bandwidths.

Each I/Q data stream which is reduced to the selected bandwidth can be further split into a plurality of sub data streams as shown for bandwidth B(D) in FIG. 6, which is split into four sub data streams with bandwidths B(D1)=500 MHz, B(D2)=100 MHz, B(D3)=300 MHz, and B(D4)=40 MHz. These sub data streams may represent different channels within one modulated signal captured at one input port of the system 10. In particular, each sub data stream can have a different bandwidth. This further splitting can be done in software and/or hardware. For instance, this further splitting is carried out by the FPGA or ASIC of the DBB 22 and/or by the signal processing unit 15. The FPGA or ASIC can be configured to split the signal in a phase coherent manner.

FIG. 7 shows a DBB 22 configuration of a system 10 operating in the second operating mode. Here, the data streams received on input ports RF A and RF C were already split in their quadrature component Q(A), Q(C) and their in-phase component I(A), I(C) by the analog front end 21. For each corresponding in-phase and quadrature signal, a bandwidth can be selected (e.g., 4000 MHz) and forwarded to the signal processing device 15 for further analysis.

Each DBB 22 can be connected to the signal processing device 15, e.g. a central processing unit or a microprocessor. The signal processing device 15 can be configured to receive and further analyze the digitalized I/Q data streams which are reduced to the selected bandwidths in parallel. The signal processing device 15 is, for example, configured to analyze the data streams in parallel using different mathematical operations and/or to further divide the received data stream into sub data streams and analyze said sub data streams in parallel.

The analysis performed by the signal processing device 15 on the I/Q data streams in the selected bandwidths and/or on the sub data streams may comprise any measurement and/or visualization of the data streams. For instance, the measurements can comprise spurious emission measurements, phase noise measurements or analysis of the frequency spectra in the selected bandwidths. The measurements can further comprise EVM measurements, e.g., including the decoding of modulated I/Q data. The analysis can be carried out by applying mathematical functions or mathematical operators to the data streams. The signal processing device 15 may comprise a display configured to display the selected bandwidth of the I/Q data streams or the sub data streams.

Figure 8A:
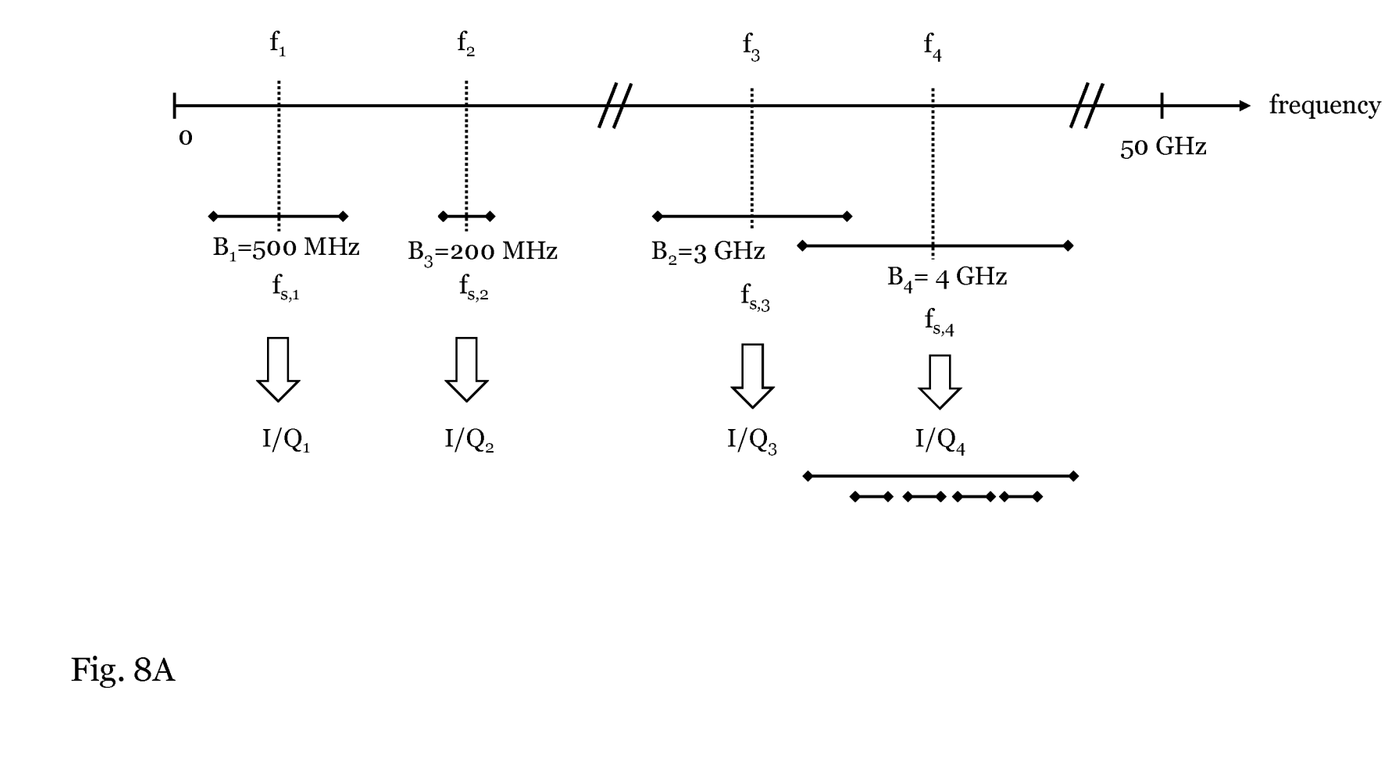
FIG. 8A shows a selection of signal components according to an embodiment.

FIG. 8A shows a selection of four signal components with bandwidth B1, B2, B3 and B4, wherein each signal component is selected at center frequencies $f_1$ to $f_4$ and sampling rates $f_{s,1}$ to $f_{s,4}$. The resulting data streams $I/Q_1$ to $I/Q_4$ can be forwarded to the signal processing device 15, wherein data stream $I/Q_4$ is further split in four sub data streams. For instance, each selected signal component represents a channel. This channel selection can be carried out in hardware or in software by the measurement system 10.

Figure 8B:
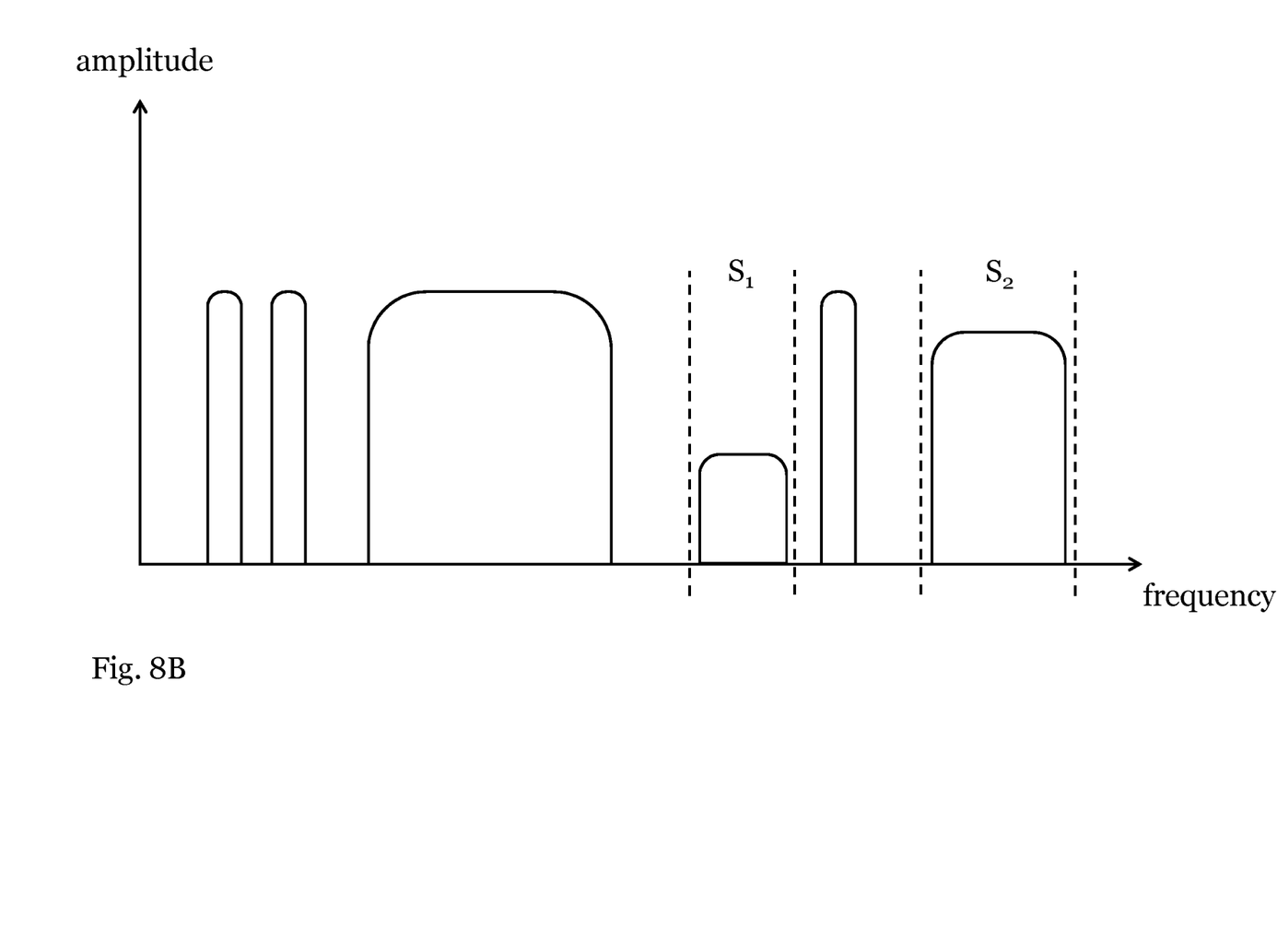
FIG. 8B shows a signal to be analyzed according to an embodiment.

FIG. 8B shows a signal to be analyzed according to an embodiment. For instance, the signal shown in FIG. 8B is applied to one or more of the input ports 13 of the measurement system 10.

The signal can be a wideband signal which comprises a plurality of signal components within its total. Each signal component can have an arbitrary bandwidth, frequency spacing and/or amplitude.

Preferably, the measurements system 10 allows a user to select, process and measure any number of signal components, e.g. signal components $S_1$ and $S_2$, of the wideband signal in parallel.

Figure 9:
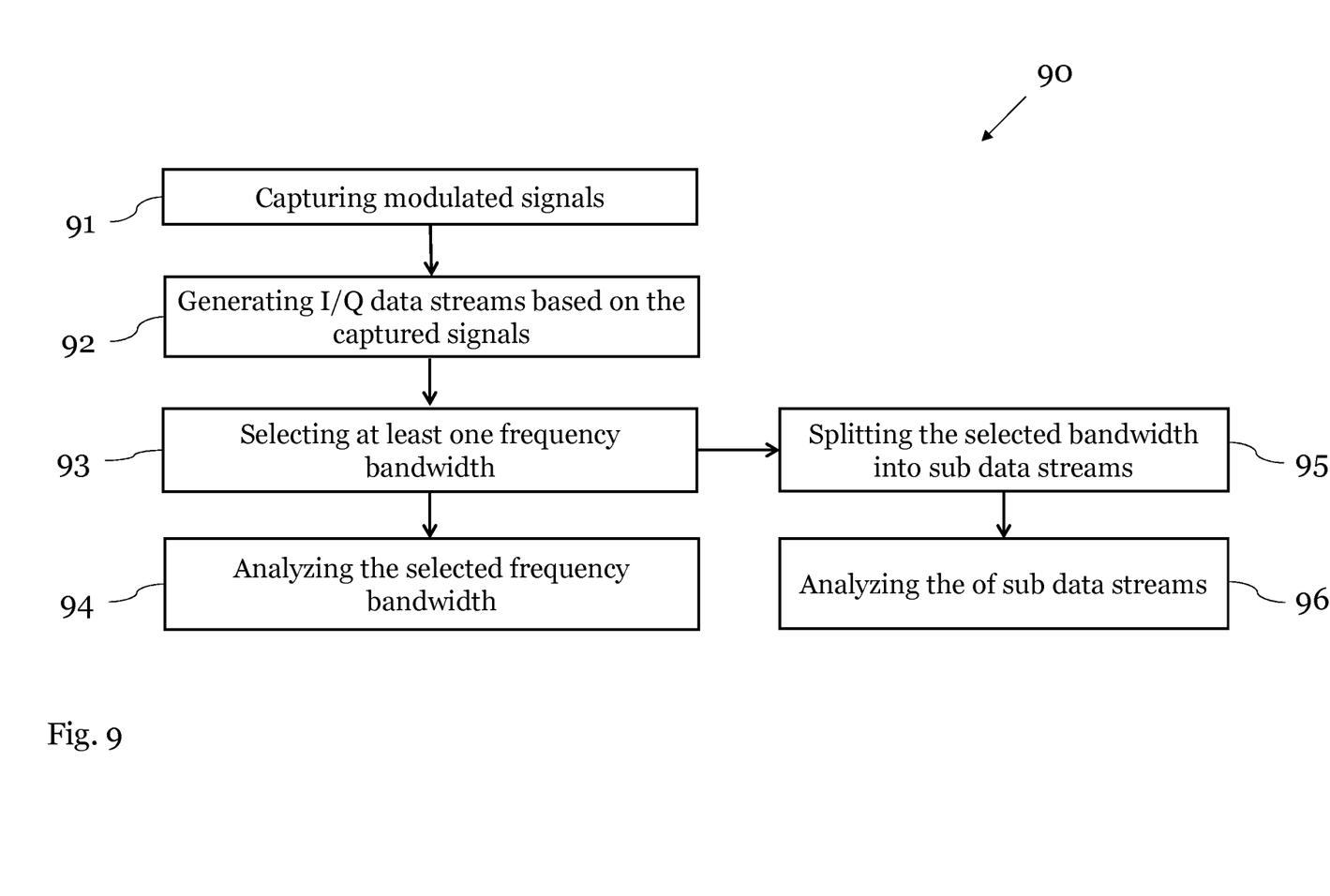
FIG. 9 shows a flow diagram of a method for measuring a modulated signal according to an embodiment.

FIG. 9 shows a flow diagram of a method 90 for measuring and analyzing modulated signals.

The method 90 comprises the steps of: capturing 91 one or more modulated signals from at least one DUT 11, wherein each captured modulated signal can be represented as an I/Q signal; generating 92 at least two digital I/Q data streams based on the one or more modulated signals, wherein the at least two digital I/Q data streams are generated in parallel; selecting 93 at least one target frequency bandwidth in each of the at least two digital I/Q data streams; and analyzing 94 the at least two digital I/Q data streams in the selected target frequency bandwidths.

The DUT 11 is preferably a wireless communication device configured to forward communication signals configured according to 5G or 6G communication standards.

The method 90 can be carried out in a first operating mode, in which at least two modulated signals from the at least one DUT 11 are captured, and a respective digital I/Q data stream is generated based on each captured modulated signal. Thereby, each digital I/Q data stream preferably represents both the in-phase and the quadrature component of a respective captured modulated signal.

In addition or alternatively, the method 90 can be carried in a second operating mode, in which a single modulated signal from the at least one DUT 11 is captured and split into an in-phase signal component and a quadrature signal component in the analog domain. Thereby, a first digital I/Q data stream is generated which represents the in-phase component of the modulated signal and a second digital I/Q data stream is generated which represents the quadrature component of the modulated signal.

As shown in FIG. 9, the method 90 may comprise the further optional steps of: splitting 95 at least one of the I/Q data streams in the selected bandwidth into a plurality of sub data streams; and preferably analyzing 96 the plurality of sub data streams. As shown in FIG. 9, said splitting step 95 can be carried out after the selection step 93, and the steps of analyzing 94 the selected frequency bandwidth of the digitalized data streams and analyzing 96 the sub data streams can be carried out simultaneously.

The method 90 shown in FIG. 9 can be carried out with a measurement systems 10 as shown in any one of FIGS. 1-5.

Figure 10:
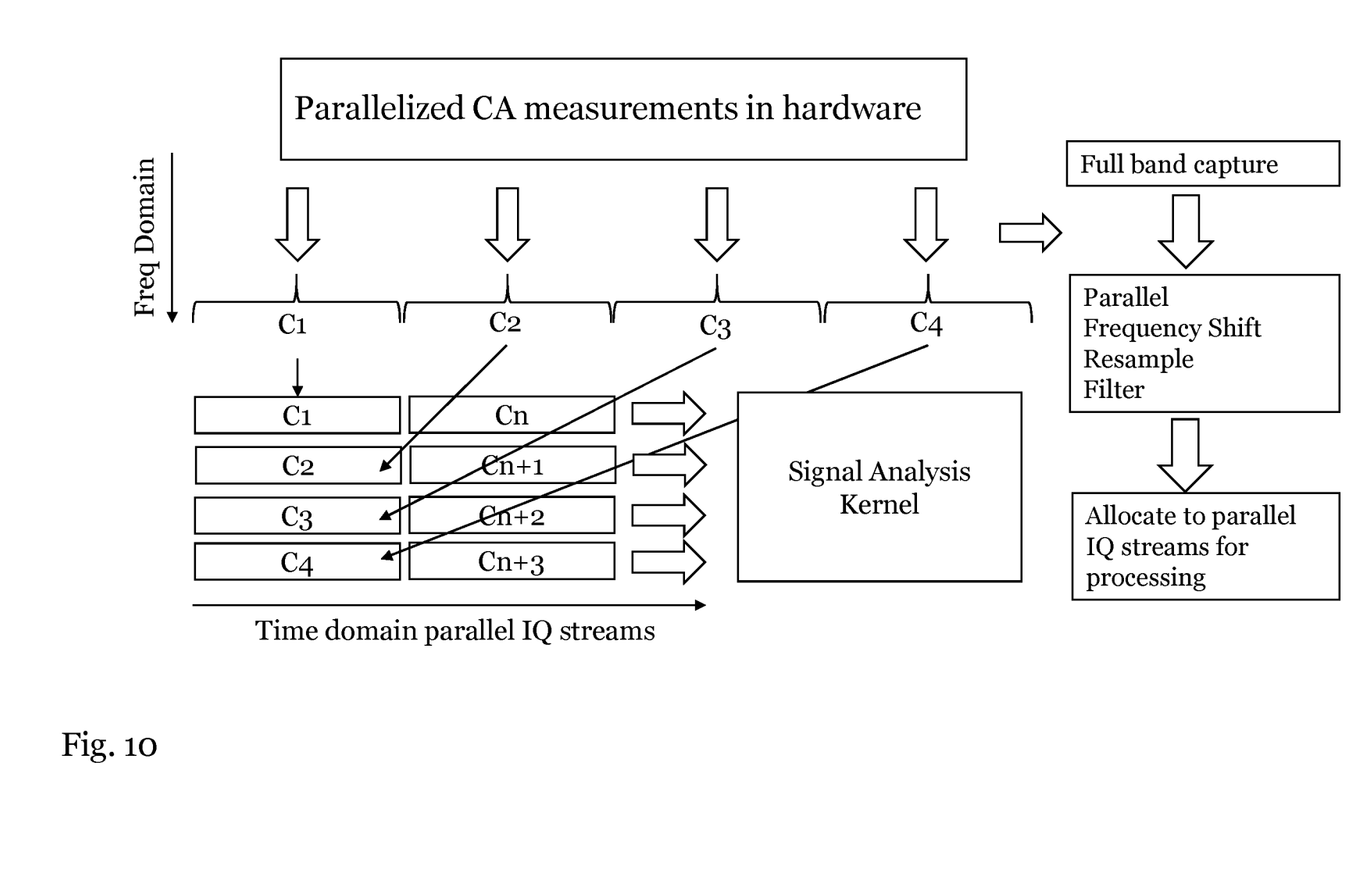
FIG. 10 shows a diagram of a measurement method according to an embodiment.

FIG. 10 shows a diagram of a measurement method according to an embodiment. In particular, the method shown in FIG. 10 is suitable for parallelized CA measurements of modulated signals.

Thereby, the complete bandwidth of all signal components of interest, e.g. all channels C1-C4 of a wideband CA signal, can be captured. Subsequently, the signals C1-C4 within the captured bandwidth can be shifted in frequency, resampled and filtered to generate parallel I/Q data streams. In this way, a parallel digital signal processing (DSP) pipeline for each carrier signal C1-C4 can be provided. The, thus, processed carriers can be queued for parallel signal processing on a multi-core CPU (e.g., a DSP Kernel). By selecting suitable triggering and sequencing processes in hardware this measurement can be further automated.

This approach allows for a hardware accelerated measurement of communication signals with carrier aggregation, i.e. of signals which comprise multiple carriers. Due to the parallelization, this approach can be much faster than alternative approaches in which the carrier signals are examined one after another (e.g., by tuning to the frequency of a first carrier, performing levelling of said signal, capturing IQ data at bandwidth of the first carrier, applying filtering and performing a measurement with the first carrier signal).

The measurement method shown in FIG. 10 can be carried out with the measurements system 10 as shown in any one of FIGS. 1-5.

All features described above or features shown in the figures can be combined with each other in any advantageous manner within the scope of the invention.

The invention claimed is:

1. A measurement system, in particular a signal analyzer or monitoring receiver, for measuring and analyzing modulated signals, comprising:
    a signal acquisition device having one or more input ports, wherein the signal acquisition device is configured to capture one or more modulated signals applied to the input ports, wherein each captured modulated signal can be represented as an I/Q signal;
    wherein the signal acquisition device is configured to generate at least two digital I/Q data streams based on the one or more modulated signals, wherein the at least two digital I/Q data streams are generated in parallel;
    a selection device configured to select at least one target frequency bandwidth in each of the at least two digital I/Q data streams; and
    a signal processing device configured to analyze the at least two digital I/Q data streams in the selected target frequency bandwidths,
    wherein the selection device is configured to further split at least one of the I/O data streams in the selected bandwidth into a plurality of sub-data streams.

2. The measurement system of claim 1,
    wherein the signal acquisition device comprises at least two ADC units configured to convert the one or more modulated signals into the at the least two digital I/Q data streams.

3. The measurement system of claim 2,
    wherein the signal acquisition device has at least two input ports;
    wherein, in a first operating mode, the signal acquisition device is configured to capture a respective modulated signal at each input port, and to feed each captured modulated signal to a respective ADC unit for generating a respective digital I/Q data stream, wherein each digital I/Q data stream represents both an in-phase and a quadrature component of a respective captured modulated signal.

4. The measurement system of claim 3,
    wherein the signal acquisition device comprises two mixing units;
    wherein, in the first operating mode, each mixing unit is configured to mix one of the captured modulated signals down to an intermediate frequency and, subsequently, feed the signal to one of the ADC units.

5. The measurement system of claim 3,
    wherein, in a second operating mode, the signal acquisition device is configured to capture a single modulated signal at one of the input ports, and to split the modulated signal into an in-phase signal component and a quadrature signal component in the analog domain;
    wherein the signal acquisition device is configured to feed each of the in-phase and quadrature signal components to a different ADC unit in order to generate a first digital I/Q data stream representing the in-phase component of the modulated signal and a second digital I/Q data stream representing the quadrature component of the modulated signal.

6. The measurement system of claim 5,
    wherein the signal acquisition device comprises two further mixing units, wherein the local oscillator signals of the two further mixing units have a 90° phase shift to each other;
    wherein, in the second operating mode, each of the two further mixing units is configured to receive the single modulated signal and to generate either the in-phase component or the quadrature component of the modulated signal.

7. The measurement system of claim 1,
    wherein the signal processing device is configured to receive and to analyze the plurality of sub data streams, preferably in parallel.

8. The measurement system of claim 1,
    wherein the selection device comprises at least one field programmable gate array, FPGA, or at least one ASIC.

9. The measurement system of claim 1,
    wherein at least one of the digital I/Q data streams comprises data over the entire bandwidth of a modulated signal received at the input ports or of a certain frequency span of the modulated signal.

10. A method for measuring and analyzing modulated signals, comprising:
    capturing one or more modulated signals from at least one device-under-test, DUT, in particular from a wireless communication device, wherein each captured modulated signal can be represented as an I/Q signal;
    generating at least two digital I/Q data streams based on the one or more modulated signals, wherein the at least two digital I/Q data streams are generated in parallel;
    selecting at least one target frequency bandwidth in each of the at least two digital I/Q data streams; and
    analyzing the at least two digital I/Q data streams in the selected target frequency bandwidths,
    wherein the method further comprises the step of: splitting at least one of the I/Q data streams in the selected bandwidth into a plurality of sub data streams.

11. The method of claim 10,
    wherein, in a first operating mode, at least two modulated signals from the at least one DUT are captured, and a respective digital I/Q data stream is generated based on each captured modulated signal, wherein each digital I/Q data stream represents both an in-phase and a quadrature component of a respective captured modulated signal.

12. The method of claim 10,
    wherein, in a second operating mode, a single modulated signal from the at least one DUT is captured and split into an in-phase signal component and a quadrature signal component in the analog domain;

wherein a first digital I/Q data stream representing the in-phase component of the modulated signal and a second digital I/Q data stream representing the quadrature component of the modulated signal are generated.

13. The method of claim 10 further comprising the step of: analyzing the plurality of sub data streams, preferably in parallel.

* * * * *